(12) United States Patent
Digrazia et al.

(10) Patent No.: US 10,802,156 B2
(45) Date of Patent: Oct. 13, 2020

(54) DEVICE MODULE FOR THE DETECTION OF TEMPERATURE COMPENSATED CRYSTAL OSCILLATOR ORIGINATED MICRO-JUMPS IN A GLOBAL NAVIGATION SATELLITE SYSTEM AND RELATED DETECTION METHOD

(71) Applicant: STMicroelectronics S.r.l., Agrate Brianza (MB) (IT)

(72) Inventors: Domenico Digrazia, Cesa (IT); Fabio Pisoni, Busto Garolfo (IT)

(73) Assignee: STMicroelectronics S.r.l., Agrate Brianza (MB) (IT)

( * ) Notice: Subject to any disclaimer, the term of this patent is extended or adjusted under 35 U.S.C. 154(b) by 261 days.

(21) Appl. No.: 15/980,221

(22) Filed: May 15, 2018

(65) Prior Publication Data

US 2018/0329069 A1 Nov. 15, 2018

(30) Foreign Application Priority Data

May 15, 2017 (IT) .......................... 102017000052505

(51) Int. Cl.
  *G01S 19/23* (2010.01)
  *G01S 19/29* (2010.01)
(52) U.S. Cl.
  CPC ............ *G01S 19/23* (2013.01); *G01S 19/235* (2013.01); *G01S 19/29* (2013.01)

(58) Field of Classification Search
  CPC .......... G01S 19/09; G01S 19/23; G01S 19/29; G01S 19/235
  See application file for complete search history.

(56) References Cited

U.S. PATENT DOCUMENTS

2006/0103573 A1 5/2006 Geier et al.
2015/0301188 A1 10/2015 Broderick et al.

OTHER PUBLICATIONS

Vittorini L D: "Micro-jump screening station for GPS user equipment", Frequency Control Symposium, 1997, Proceeding of the 1997 IEEE International, Orlando, FL, USA May 28-30, 1997, New York, NY, USA.
IT Search Report and Written Opinion for IT Appl. No. 2017000052505 dated Feb. 7, 2018 (10 pages).

*Primary Examiner* — Dao L Phan
(74) *Attorney, Agent, or Firm* — Crowe & Dunleavy

(57) ABSTRACT

A Global Navigation Satellite System (GNSS) receiver includes a Temperature Compensated Crystal Oscillator (TCCO) circuit. A micro jump of the TCCO circuit is detected by monitoring wide band phase values and carrier to noise ratio estimate values for each tracking channel of the tracking modules for the GNSS receiver. In response to a detected micro-jump, a frequency correction is calculated and applied to numerically controlled oscillators of phase/frequency lock loop circuits within tracking modules.

18 Claims, 4 Drawing Sheets

DEVICE MODULE FOR THE DETECTION OF TEMPERATURE COMPENSATED CRYSTAL OSCILLATOR ORIGINATED MICRO-JUMPS IN A GLOBAL NAVIGATION SATELLITE SYSTEM AND RELATED DETECTION METHOD

PRIORITY CLAIM

This application claims the priority benefit of Italian Application for Patent No. 102017000052505, filed on May 15, 2017, the disclosure of which is hereby incorporated by reference in its entirety to the maximum extent allowable by law.

TECHNICAL FIELD

Embodiments of the present disclosure relate to solutions concerning the detection and removal of micro-jumps of the Temperature Compensated Crystal Oscillator in GNSS (Global Navigation Satellite System) satellite positioning systems, in particular in GNSS receivers.

The present disclosure in particular refers to techniques for tracking CDMA-type satellite signals in critical conditions, e.g. when Temperature Compensated Crystal Oscillator jumps happen.

BACKGROUND

The TCXO, Temperature Compensated Crystal Oscillator, is a form of crystal oscillator used where a precision frequency source is required within a small space and at a reasonable cost. By applying temperature compensation within the crystal oscillator module, it is possible to considerably improve on the basic performance of the oscillator. One possible application is in the satellite based positioning and navigation field, i.e. the capability of a receiver to determine user position, velocity and time using satellite system information, like GPS (Global Positioning System). The TCXO can be placed and operating inside the chips of the GNSS devices. The improvement of the oscillator performance improves the performance of the navigation unit in terms of reported velocity, position accuracy and general availability, allowing tight tracking for GNSS satellites.

More specifically, a navigation receiver operates by down converting to quasi baseband the input signal received from the satellites, which is transmitted at L band (1-2 GHz), using a very stable local oscillator, controlled in temperature, i.e. the TCXO, to step down the input frequency and allow a baseband digital management of the Satellite information. However, even a few parts per billion sudden drift in the TCXO output frequency can destroy the demodulation and the lock condition of the satellites being tracked by the navigation receiver.

Once the nominal frequency offset of the TCXO has been evaluated, a delta frequency $\Delta f_i$ among consecutive epochs in the tracking loop of any tracked satellite can be considered only related to the reciprocal movement (radial velocity) between a user and a Satellite Vehicle (Doppler effect) and very accurate loops, with pre-detection bandwidth set to the maximum usable (20 ms in the GPS case at band L1), can be adopted in order to limit this frequency estimate noisiness and achieve the best tracking sensitivity.

In this context, micro-jumps are an oscillator phenomenon where the frequency of the oscillator changes suddenly and in a not predictable way. This event definitively destroys tracking reliability.

When a micro-jump happens, a drop in Carrier to Noise Ratio, C/N0 or CnO, is reported on tracked satellites as the net effect of the instantaneous offset realized between previous tracked frequency and actual one, moved out by the physical shock.

With reference to FIG. 1, which diagrammatically shows a GNSS Global Navigation Satellite System) system 1000 (such as, for example, Global Positioning System (GPS), Global'naya Navigatsionnaya Sputnikovaya Sistema (GLONASS), Galileo System, or other types of satellite-based positioning systems), such global satellite positioning system 1000 comprises a constellation of a number NS of satellites $S_1$-$S_{NS}$ and at least a receiving apparatus 100. The satellite signals used in the GNSS (Global Navigation Satellite System) are of the CDMA-type (Code Division Multiple Access). The satellite signal reception at the receiving apparatus 100 is implemented through the following, sequentially performed, standard steps: analog filtering, frequency conversion and digitization, acquisition, tracking, decoding and positioning.

In a particular embodiment, a receiving apparatus 100 comprises an antenna 1, an analog receiving module AFE (Analog Front End), provided with a radiofrequency (RF) stage 2, and an analog-digital converter 3 (ADC), which can be implemented by hardware modules.

Further, the receiving apparatus 100 comprises a digital processing module DFE (Digital Front End), including an acquisition module 4 (ACQ), and a tracking module 5 (TRK).

Moreover, the receiving apparatus 100 is provided with a sub-frame recovery module (SBF-REC), an ephemerides processing and pseudo-range calculation module 7 (EPH-PSR), a satellite orbit prediction module 8 (ORB-PRE), a satellite type detecting module 9 (MOD-DET), a satellite position calculation module 10 (SAT-POS), and a user position calculation module 11 (USR-POS).

In a particular embodiment, acquisition module 4 and tracking module 5 can be implemented by hardware, while the remaining modules 6-10 can be implemented by software. In addition, it is observed that the acquisition module 4 and tracking module 5 can also be implemented by a hardware and software combination.

The receiving apparatus 100 is provided with a central processing unit, memories (mass memory and/or working storage) and respective interfaces (not shown in figures), comprising a microprocessor or microcontroller, for running the software resident in it.

The following embodiments are described in a non-limiting way referring to the GPS technology, however the teachings of the present disclosure can be applied also to other satellite positioning systems.

When the receiving apparatus 100 operates, an antenna 1 receives a plurality of signals from one or more satellites $S_1$-$S_{NS}$ of the constellation of satellites operating in system 1000. For example, these signals can be modulated on a carrier having a frequency of about 1.5 GHz. Particularly, each received signal transports a pseudo-random code and a message for the data communication.

The pseudo-random code, known as CA code, for example at 1 MHz, is used for distinguishing one satellite from another satellite, and enables the receiving apparatus 100 to measure the time instant at which a signal has been transmitted by a corresponding satellite. Pseudo-random code is implemented by a sequence of pulses, called chips.

The radio frequency stage 2 operates on the signals received by antenna 1 (of the analog type) and converts them to the base band or to an intermediate frequency. Analog-digital converter 3 converts the intermediate frequency signals to corresponding digital signals. The radio-frequency stage 2 operates the conversion at an intermediate frequency using the frequency of a local signal LS generated by a Temperature Compensated Crystal Oscillator (TCXO) 2a.

The acquisition block 4 identifies in the digital signals originated by the analog-digital converter 3 the satellites in visibility, testing for their presence by trying to match their transmitted PRN (Pseudo Random Noise) code sequence, i.e. the CA code, with a corresponding local replica and when a peak confirmation is found provide the initial GNSS information, i.e. code/frequency information to an elementary Intermediate Frequency tracking correlation block. Further, the acquisition module 4 detects a plurality of parameters associated to the satellites and used for time tracking the satellite.

The data navigation message transports data (for example at a bit rate equal to 50 Hz) and particularly is modulated based on the Binary Phase Shift Keying (BPSK) technique. Further, data navigation message is hierarchically divided in frames and sub-frames and transports several information, among them a plurality of parameters used for determining the orbit and consequently the position of satellites.

The tracking module 5 has plural channels, indicated by a channel index i from 0 to NS−1, in particular indicated as $TRK_0 \ldots TRK_{NS-1}$ and each is allocated to a different satellite. Specifically, the tracking module 5 is configured to operate as a frequency locked loop. Based on a further embodiment, tracking module 5 is configured to implement a phase locked loop.

The tracking module 5 is configured to supply data to the sub-frame recovery module 6, as a time sequence of samples pairs, indicated with {I, Q}. Each sample {I, Q} is, for example, the result of a coherent integration, respectively in-phase and in quadrature phase, of a bit of 20 msec, performed by a correlator based on the modulation technique Binary Phase Shift Keying (BPSK), each samples pair {I, Q} represents a transmitted bit.

As it is known in the field of the digital communication theory, each sample {I, Q} can be further interpreted as a phasor, by considering the value I and value Q as the real and imaginary parts of a bi-dimensional vector in the complex Cartesian plane.

Moreover, for each satellite, in the tracking module 5 the Doppler frequency and the transfer time of the GPS signal transmitted by a satellite $S_1$-$S_{NS}$ are determined.

The sub-frame recovery module 6, by means of suitable algorithms, decodes the different received sub-frames forming the navigation data message. The ephemerides processing and pseudo-range calculation module 7 stores the satellite orbit, as ephemerides data and calculates the existent distances between the satellites and receiving apparatus 100: such distances are called pseudo-range. By these calculated values, and the time for transferring the GPS signal, the satellite position calculation module 10 calculates the positions of the satellites expressed by 3D coordinates, at the moment of transmission.

The satellite orbit prediction module 8 can be activated for assisting the ephemerides processing and pseudo-range calculation module 7 and/or satellite position calculation module 10 when the ephemerides data are not available at the receiving apparatus 100.

The satellite type detecting module 9 is configured to determine the type of the tracked satellite and by it to select the solar radiation pressure model, which better provides for the shape, mass and size of a satellite, to be used in the orbit prediction by the satellite orbit prediction module 8, according to modes that will be described in the following as examples.

In this embodiment, the satellite position calculation module 10 operates on the time for transferring the GPS signal together with the reception time (known due to a clock inside the receiving apparatus 100). The satellite position calculation module 10 operates in order to evaluate how much time is required to the signal from each satellite for reaching the receiving apparatus 100, evaluating in this way the distance from the corresponding satellite (pseudo-range).

By a triangulation algorithm, the user position calculation module 11 calculates the position of the receiving apparatus 100 based on the distances of the receiving apparatus 100 preferably from at least four satellites and based on the positions of the same satellites, known at this processing stage. In the following, the position of the receiving apparatus 100 (practically coinciding with the user position) will be called "fix".

As mentioned, the tracking module 5 includes a plurality of channels, i.e. tracking correlation blocks which are usually working in parallel each tuned on a different satellite PRN code and frequency, among the ones previously identified by the acquisition block 4, with the goal to confirm or eventually discard the acquisition hypothesis for every of them. For the confirmed satellites, after a startup refinement of the code and frequency initially provided by the acquisition block, the stable locked tracking phase starts. It consists of tightly following both the frequency offset (velocity) and the code phase (distance) of the satellite vehicle being analyzed and to demodulate the position and time information embedded in its bit stream. This information is then provided to a Kalman Filter to triangulate the receiver position.

It is worth noting that such Intermediate Frequency IFsat at which each tracking channel of the tracking block 5 is tuned can be viewed as sum of two frequency offsets:
  a residual TCXO offset IFtcxo coming from the TCXO used for the down conversion of the nominal transmitted RF frequency to the nominal Intermediate Frequency (IF)
  a Doppler Effect frequency offset Fdoppler caused by the reciprocal motions of the satellite and the receiving apparatus,
  so that:

$$IFsat=IFtcxo+Fdoppler$$

In usual conditions the TCXO offset IFtcxo, once identified, is a slowly moving offset that does not impact on the dynamic of every frequency tracking loop.

The bandwidth of the satellite frequency loop is, for this reason, tailored on the max Doppler rate only and not on external events like TCXO jumps. This is to achieve the best quality performance (low noise) using narrow band frequency filtering schemes.

Satellite in phase (I) and quadrature phase (Q) correlation samples are available at tracking side every millisecond (I, Q samples). Such information are incoherently accumulated starting from a valid bit edge phase over 20 ms, bit length of GPS information, to build corresponding accumulated quantities ($I_{sum20}$, $Q_{sum20}$) and then mixed between consecutive bits to produce mixed quantities ($I_{MIX}$, $Q_{MIX}$) corresponding to the beat information that are used to detect a delta phase, or equivalently a frequency offset, with respect to the already tracked one, and update the frequency value at which the satellite is tracked.

It is common rule to not apply every 20 ms the decision rule, based on current mixed quantities (Imix$_k$, Qmix$_k$), but averaging consecutive 20 ms delta phases over a number L (typically 10) of intervals in order to filter the decision value and to guarantee the less noisy possible frequency tracking.

The standard frequency loop formulas applied in the tracking block 5 are shown in the Table 1, here below.

TABLE 1

| | |
|---|---|
| Imix$_k$ = Isum20$_k$ * Isum20$_{k-1}$ + Qsum20$_k$ * Qsum20$_{k-1}$ | (1) |
| Qmix$_k$ = Isum20$_k$ * Qsum20$_{k-1}$ − Qsum20$_k$ * Isum20$_{k-1}$ | (2) |
| $\overline{\Delta\phi} = \frac{1}{L}\sum_{k=1}^{L} -\text{Atan2}(\text{Qmix}_k, \text{Imix}_k)$ | (3) |
| $\Delta f = \frac{\overline{\Delta\phi}}{2\pi Ts}, Ts = 0.02s$ | (4) |

Index k is an index representing the k-th accumulation period, having a length corresponding to the bit length, over which the (I, Q) data, calculated with a respective shorter period of 1 ms, are accumulated and the decision rule applied. The instants at which the accumulated quantities (I$_{sum20}$, Q$_{sum20}$) are calculated are separated of the bit length of GPS information, e.g. 20 ms. In other words, the (I, Q) quantities are calculated over a shorter period with respect to the accumulation period, in particular each 1 ms, for instance, and Isum20$_{k-1}$ is calculated through coherent accumulation over the duration of a period of a bit length, calculated from a valid data bit edge, i.e. period of index k−1, and Isum$_k$ is calculated after the subsequent period of a bit length, period of index k.

The logic aforementioned is the core of the frequency loop available in common GPS channel receiver and its bandwidth is limited by the elementary pre-detection bandwidth (bit length accumulation), and the averaging period adopted to extend the tracking sensitivity of the receiver.

This scheme fails in the case where the input frequency instantaneous jumps and the offset between the tracked frequency and the input one, sum of the TCXO offset and the Doppler Effect, suddenly exceeds the grab range of the loop.

This failure will revert in an instantaneous wrong frequency identification (bad velocity indication for the satellite transmitted to the positioning block) and a deteriorating of the tracking itself that will eventually lead to a loss of carrier to noise ratio Cn0 and to the complete loss of tracking with the need to restart the acquisition phase.

Therefore, a TXCO micro jump detector is provided to recover from micro jumps and to reduce the position/velocity error caused by wrong code/frequency identification.

Solutions are known that work starting on the effect that the TCXO jump produces, e.g. the lack of carrier to noise ratio Cn0 on locked satellites, to activate a recovery machine to try to estimate by different, parallel test trials the entity of the offset and compensate then.

However, competition logic is slow, not optimal, based on trial and error heuristic.

In view of the above, there is a need in the art to provide solutions which overcome one or more of the above drawbacks.

SUMMARY

According to one or more embodiments, the foregoing need is addressed by means of a device module for the detection of Temperature Compensated Crystal Oscillator originated micro jumps in a GNSS receiver. Embodiments moreover concern a related method and receiver.

The claims are an integral part of the technical teaching of the disclosure provided herein.

A device module for the detection of Temperature Compensated Crystal Oscillator originated micro-jumps in a GNSS (Global Navigation Satellite System) receiver, where said receiver comprises a radio frequency stage associated to a Temperature Compensated Crystal Oscillator to down convert received satellite signals as a function of the frequency of Temperature Compensated Crystal Oscillator, comprises an analog digital conversion module to obtain digital signals from the down converted satellite signals, an acquisition module configured to identify in the digital signals codes of the satellites in visibility of the receiver and provide corresponding GNSS information, in particular code and frequency information, supplying, in particular at a given sampling period, in particular by means of correlators, samples of in phase and quadrature components of said GNSS information to a tracking module, comprising a plurality of tracking channels comprising frequency or phase locked loop adjusting tracking numerical controlled oscillators which frequency is used to demodulate said GNSS information, said tracking module including accumulating over an accumulation period having the bit length of the GNSS information and mixing between consecutive bits to produce mixed quantities which are used to compute an averaged phase rate used as set point of said frequency or phase loop, wherein it comprises a feeder module configured to mix the information in the in phase and quadrature components inside the bit time frame of the GNSS information, to obtain a wide band phase and configured to obtain a previous carrier to noise ratio estimate value, available on the channel from accumulation over the previous accumulation period, a vector table module, configured to store the wide band phase and the previous carrier to noise ratio estimate value for each tracking channel of the tracking module, the feeder module being configured to populate said vector table module with said wide band phase and previous carrier to noise ratio estimate value, a global monitor module configured to scan the vector table module and to detect the occurrence of a micro-jump on the basis of the values of the wide band phase and previous carrier to noise ratio estimate present for each tracking channel in said vector table module, said global monitor module being further configured to compute an amount of said detected micro-jump and use said amount to update said tracking numerical controlled oscillator.

In variant embodiments, said global monitor module is further configured to set a micro jump detection flag.

In variant embodiments, said compute an amount of said detected micro-jump include calculating a weighted phase average and to convert it in frequency.

In variant embodiments, said global monitor is configured to verify, for a given tracking channel, that the previous carrier to noise ratio estimate value is greater or equal than a minimum threshold value, checking if an absolute value of the wideband phase is greater than a wideband phase threshold counting a number of channels for which said checking is not verified and counting a number of channels for which said checking is verified, counting the number of channels for which said checking is verified and the wideband phase has the same sign, performing a detection test on the basis of said number of channels for which said checking is not verified, number of channels for which said checking is verified and number of channels for which said checking is verified and the wideband phase has the same sign, if the detection test is verified, performing said operation of computing an amount of said detected micro-jump and use said amount to update said tracking numerical controlled oscillator.

In variant embodiments, performing a detection test includes verifying said number of channels for which said checking is not verified is lower than a given value, said number of channels for which said checking is verified is greater than a given value, said absolute value of the sign counter is equal to the value of the jump counter.

In variant embodiments, said number of channels for which said checking is verified and the wideband phase has the same sign is equal to the number of channels for which said checking is verified.

In an embodiment, a method for the detection of Temperature Compensated Crystal Oscillator originated microjumps in a GNSS (Global Navigation Satellite System) receiver, comprises performing: a down conversion of received satellite signals as a function of the frequency of a Temperature Compensated Crystal Oscillator, an analog digital conversion to obtain digital signals from the down converted satellite signals, an acquisition to identify in the digital signals codes of the satellites in visibility of the receiver and provide corresponding GNSS information, in particular code and frequency information, supplying samples at a given accumulation period of in phase and quadrature components of said GNSS information to a tracking operation, over a plurality of tracking channels using frequency or phase locked loop to adjust numerical controlled oscillators which frequency is used to demodulate said GNSS information, said tracking operation including accumulating over a bit length of the GNSS information and mixing (between consecutive bits to produce mixed quantities which are used to compute an averaged phase rate used as set point of said frequency or phase loop, wherein it comprises mixing the information in the in phase and quadrature components inside the bit time frame of the GNSS information, to obtain a wide band phase and obtaining a previous carrier to noise ratio estimate value, available on the channel from accumulation over the previous accumulation period, storing in a table the wide band phase and the previous carrier to noise ratio estimate value for each tracking channel of the tracking module, scanning the vector table to detect the occurrence of a micro jump on the basis of the values of the wide band phase and previous carrier to noise ratio estimate present for each tracking channel in said vector table, further computing an amount of said detected microjump and using said amount to update said tracking numerical controlled oscillators.

An embodiment also relates to a receiver comprising the detector module as described above.

BRIEF DESCRIPTION OF THE DRAWINGS

Embodiments of the present disclosure will now be described with reference to the annexed drawings, which are provided purely by way of non-limiting example and in which.

DETAILED DESCRIPTION

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

In general, in order to prevent loss of tracking when TCXO jump happen and to reduce the bad frequency identification issue in the transition phase a TCXO jump detector scheme has been derived at tracking side of the GNSS receiver.

Every channel tracking is involved in the scheme and cooperates to the TCXO jump detection populating a table with key tracking information, which will be continuously analyzed by an overall monitor, responsible for the decision.

Hereafter reported the block diagram of the "TCXO jump detector module".

Figure 1:
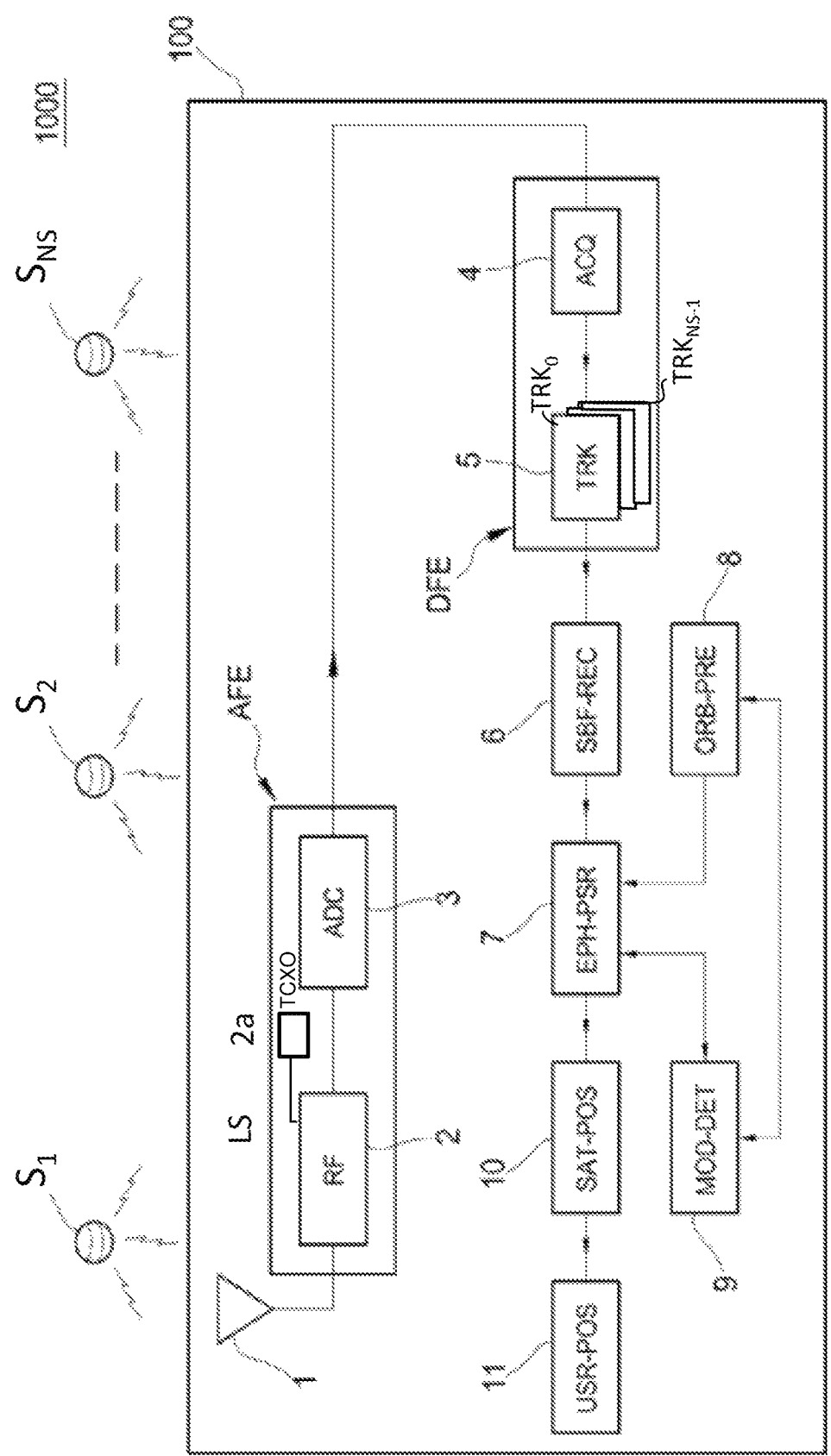
FIG. 1 has been already described in the foregoing.

To this regard, in FIG. 1 it is shown a block schematics of a TCXO microjump detector 200. In general, in FIG. 2 there is shown the tracking channels $TRK_0 \ldots TRK_{NS-1}$ of the tracking module 5, which receive respective (I, Q) samples from respective elementary Intermediate Frequency tracking correlation blocks 41 of the acquisition module 4. Each i-th tracking channel $TRK_i$ includes, in a way known per se, a frequency locked loop 51 and a carrier to noise ratio meter 52, which estimates the carrier to noise ratio over each k-th accumulation period, supplying a carrier to noise ratio estimate $Cn^*_k$.

The TCXO microjump detector 200 comprises three main blocks:

a vector table module 220, which is a structured memory block, stored in a memory specifically provided in the receiver 100 or in the memory resources already available at the receiver 100, in which the relevant information for the micro-jump identification is stored by every tracking channel $TRK_i$. The vector table 220 includes three columns, the first containing the channel index i of the tracking channel $TRK_i$, the second containing a wideband (WB) phase $\Delta\phi_{10}$ value, expressed for instance in degrees, and the third containing a previous carrier to noise estimate $Cn^*_{(k-1)}$, i.e. the carrier to noise estimate obtained by the system, in particular by the carrier to noise ratio meter 52 at the preceding accumulation period k−1, i.e. over the preceding bit length, in particular 20 ms, which corresponds to a stable indication of a Carrier to Noise ratio value. The vector table module 220 can include also other or different relevant information for the micro jump identification;

a unitary information feeder module 210, which is comprised in each tracking channel $TRK_i$, thus replicated a number NS−1 of times, where NS is the number of tracking channels, corresponding to that of the satellites S1 . . . $S_{NS}$, that every time the bit boundary is reached updates its own record of the vector table 210;

a global monitor module 230, which is obtained by a software routine, in particular implemented by a microprocessor in the receiver 100, which performs micro-jump detection at system level using the information stored in the vector table 220.

In general, such modules 210, 220, 230, as mentioned, can be implemented by adding specific processing and storing circuitry in the receiver 100, or can be obtained exploiting processing and storing circuitry already available in the receiver 100. More in particular such modules can be introduced in the DFE in the vectorial block of the tracking module 5, monitoring its status.

It is underlined that being the satellites distance to the user different in the thousands of miles, it implies that bit boundary is asynchronous among satellites, therefore the update of the vector table module 220 rows is also asynchronous.

This also means that though the TCXO jump phenomenon is common in time to every tracking channel $TRK_i$, i.e. all the channels experience it at the same time, the phase change information that identifies the jump as frequency shift cannot be considered as immediately available (already transferred) into the vector table module 220 for all the satellites, and the global monitor module 230 has to read it at a very fast rate (typical 20/25 ms) in order to catch as soon as possible the event.

Every tracking channel $TRK_0$ . . . $TRK_{NS}$−1, as mentioned, has its own frequency tracking loop 51 that is responsible to periodically update the frequency tracking value, in particular updating a hardware numerically controlled oscillator (NCO) 54, in particular $54_0$ for channel $TRK_0$ and $54_{NS-1}$ for channel $TRK_{NS-1}$. This update is based on the accumulated quantities ($I_{sum20}$, $Q_{sum20}$) mixed between consecutive bits and is executed periodically, every L bits time, using the formulas (1), (2), (3), (4) shown in Table 1.

Figure 3:
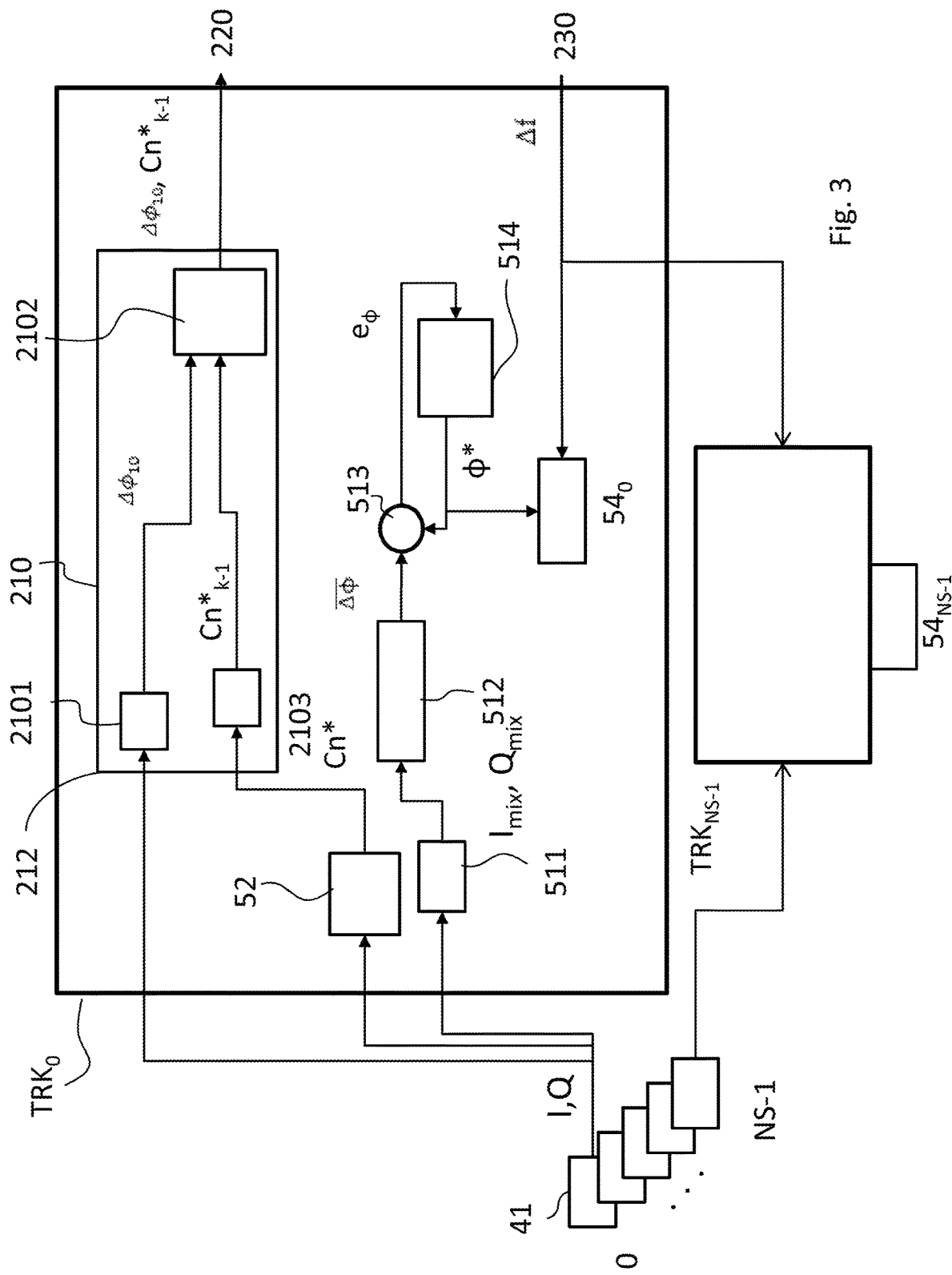
FIG. 3 shows details of modules of the embodiment of FIG. 2.

In FIG. 3 it is shown a frequency locking loop 51 which is of the standard type, having a classical $2^{nd}$ order filter, implemented for the generic tracking channel. A plurality of correlator blocks 41, one for each channel from 0 to NS−1, generates the (I, Q) data, for instance with a periodicity of 1 ms, from the signal down-converted in block 2 and sampled in the acquisition block 4. As mentioned then such (I, Q) data generated each 1 ms are accumulated over a bit period of 20 ms, starting from a valid data bit edge, obtaining the accumulated quantities Isum20. In FIG. 3, it is shown only the frequency locking loop 51 pertaining one channel, i.e. channel $TRK_0$, however other similar frequency locking loops 51 are provided for the other channels. The (I, Q) data are supplied to a summation block 511 which performs incoherent bit edge accumulation and mixing formation between consecutive bits according to the formulas (1) and (2) in Table 1, obtaining the mixed quantities $I_{mix}$, $Q_{mix}$. Then, in a block 512 averaging of the measured phase rate is performed, in particular according to equation (3) in Table 1. The output, i.e. an averaged phase rate $\overline{\Delta\phi}$, is supplied to a summation node 513 which performs the difference with a phase rate estimate $\phi^*$, supplying an average phase error phase rate estimate eφ. The average phase error phase rate estimate is filtered by a $2^{nd}$ order standard FLL filter 514, which produces the phase rate estimate $\phi^*$ fed back to the summation node 513 and supplied to a NCO $54_i$, which, as mentioned, determines the frequency tracking value outputted by the tracking module 5.

Also in FIG. 3 it is shown the Cn0 meter 52 which estimates, on the basis of the (I, Q) data the carrier to noise ration of the channel at a given period k, i.e. $Cn^*_k$.

The frequency locking loop 51 and Cn0 meter 52 are substantially standard modules. According to the solution here described, they are associated however, for each channel, to the unitary feeder module 210, which includes a wideband phase estimator, obtained by a summation block 2101, receiving the (I, Q) data and configured to perform an intra-bit mixing for wideband phase evaluation, a wideband phase $\Delta\phi_{10}$. The summation block 2101 defines a wideband phase estimator that mixes the information in the I, Q samples in a faster rate with respect to the block t11 which performs incoherent bit edge accumulation and mixing formation between consecutive bits according to the formulas (1) and (2) in Table 1, obtaining the mixed quantities $I_{mix}$, $Q_{mix}$, i.e. performs the mixing inside the bit time frame, e.g. every 1, 2, 5, 10 ms. The unitary feeder module 210 includes also a delay block 2103, equivalent to the $z^{-1}$ discrete-time operator, which receives the output of the Cn0 meter 52 and supplies the carrier to noise $Cn^*_{(k-1)}$ estimate value available on the channel from accumulation over the previous accumulation period, i.e. at the accumulation period of index k−1. With 2102 is indicated a block receiving such wideband phase $\Delta\phi_{10}$ and Cn0 value available on the channel at the previous accumulation period and updates the corresponding row in the table of module 220, in particular at every bit edge (e.g. every 20 ms).

Substantially, for each channel $TRK_i$ is supplied a standard frequency locking loop 51 and a standard Cn0 meter 52, which are enhanced by having in parallel a wideband phase estimator 210 that mixes the information in the I, Q samples in a faster rate, inside the bit time frame, i.e intrabit, e.g. every 1, 2, 5, 10 ms.

Referring, for simplicity, to a 10 ms intrabit accumulation, the wideband quantities introduced and used to feed the vector table module 220 are ($Isum_{1\_10}$, $Qsum_{1\_10}$), ($Isum_{11\_20}$, $Qsum_{11\_20}$), that refers to the first and last 10 ms IQ information inside the bit time frame and are used to derive wideband mixed quantities ($Imix_{10}$, $Qmix_{10}$) and the wideband phase quantity $\Delta\phi_{10}$ as $$Imix_{10}=Isum_{11\_20}*Isum_{1\_10}+Qsum_{11\_20}*Qsum_{1\_} \quad (5)$$

$$Qmix_{10}=Isum_{11\_20}*Qsum_{1_{10}}-Qsum_{11\_20}*Isum_{1\_} \quad (6)$$

$$\Delta\phi_{10}=-a\tan 2(Qmix_{10},Imix_{10}) \quad (7)$$

In usual tracking conditions, the wideband phase $\Delta\phi_{10}$ value is a noisy version of half the averaged phase rate $\overline{\Delta\phi}$ value because the sampling time has been halved. Clearly jumps in frequency that cause abs($\Delta\phi10$) to be bigger than $\pi/2$ radians will not be detected at all by the standard loop 51 because of foldering and will result in a missing frequency update by the standard loop and a loss of Cn0 in the tracking if not compensated instantaneously.

The absolute value of wideband phase $\Delta\phi_{10}$, at the end of the bit frame, when bigger than $\pi/2$ radians is a clear indication of a shift of frequency already consumed that cannot be managed by the standard loop 51 and a potential indication for a μ-jump being occurred.

This wideband phase detector output $\Delta\phi_{10}$, together with the Cn0 value available on the channel at the previous accumulation period, is the quantity that is identified as the reliability channel tracking status indicator before the event, are forwarded to the vector table 220, at every bit edge (20 ms), to populate the row related to the channel.

It is worth nothing that the Cn0 meter 52 is a standard block of a tracking loop and that the Cn0 information forwarded to the vector table module 220 refers to previous bit time frames (k−1 accumulation period) since at the time the TCXO jump happens it wastes the Cn0 evaluation too.

Figure 2:
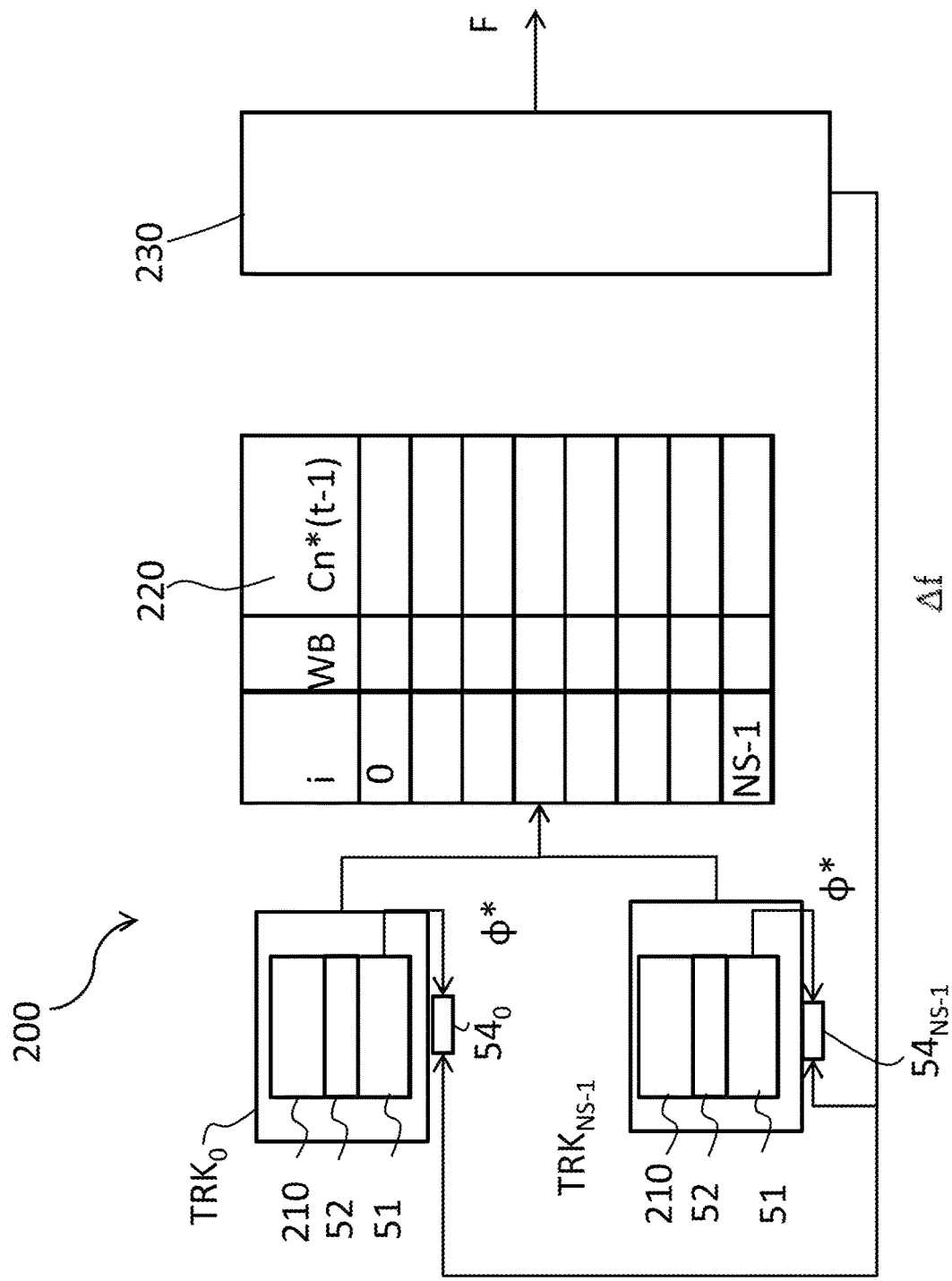
FIG. 2 shows an embodiment of a device for the detection of micro jumps here described.

As shown in FIGS. 2 and 3, the unitary feeder 210 feeds the wideband phase and Cn0 value to the table 220, which values are scanned by the global monitor 230, which detects the micro-jumps, and, in the affirmative, supplies to the controlled oscillator 54i of each i-th channel a TCXO jump value $\Delta f$ to correct the controlled oscillator 54i. The global monitor 230 additionally sets also a detection flag F.

The global monitor module 230 operates as an independent software routine, with respect to the single tracking frequency loop of every i-th channel $TRK_i$, that samples the status of the vector table 220, e.g. the wideband phase $\Delta\phi_{10}$ and carrier to noise $Cn0^*_{k-1}$ values provided by all the tracked channels, and applies a micro-jump detection procedure to parallel shift their frequency tracking when the micro jump is detected.

The micro-jump detection procedure, a detailed embodiment of which is described later with reference to FIG. 4, includes that the global monitor module 230 scans the vector table 220 rows. The scan is performed at a rate that is in the order of the GNSS system data bit rate, i.e. 50 Hz for the GPS, to promptly react to the event and to recover from it in a seamless way.

During this scan operation, is set a minimum carrier to noise ratio threshold value Cn0_thr which enables to consider the wideband phase $\Delta\phi_{10}$ of a given table row (identified for instance by the channel index i) as meaningful for the analysis, i.e. not so noisy to be discarded. The value of the minimum carrier to noise ratio threshold value Cn0_thr can be for instance set at 30 dBHz.

The monitor 230 is configured to skip the rows of table 220 for satellites not in tracking at the time the scan is executed or with a previous carrier to noise ratio less than the minimum carrier to noise ratio threshold value Cn0_thr do not participate to the following micro-jump counting procedure.

A micro jump is detected by the global monitor 230 in the case at least a given number N of valid channels, e.g. channels in tracking and with a previous carrier to noise ratio $Cn^*_{k-1}$ bigger than the minimum carrier to noise ratio threshold value Cn0_thr value, report at the same time, that is during the same table scanning, a wideband phase abs ($\Delta\phi_{10}$) bigger than a minimum threshold wideband phase value $\Delta\Phi\_thr$, in particular with the same sign, and no more than a given number M of valid channels do not report it, i.e. M is the number of no jump valid channels.

The wideband phase abs($\Delta\phi_{10}$) that triggers the micro-jump detection counting update, which includes in particular updating, i.e. increasing, a jump counter, for a valid row is set for instance to be the minimum threshold wideband phase value $\Delta\Phi\_thr=\pi/4$. This is less than the grab range limit for the standard loop, ($\pi/2$, grab range is $\pm\pi$, i.e. $\pm\pi/2$ for the 10 ms loop), but would nevertheless correspond to an acceleration for the receiver 100 that is felt as an abnormal shift that cannot be considered caused by the relative motion between receiver and satellite (Doppler effect).

Since the band L1 wavelength is ~0.19 m it is obtained in fact for a minimum threshold wideband phase value $\Delta\Phi\_thr=\pi/4\rightarrow(12.5$ (Hz)*0.19 (m)*50 (bit/s))~110 m/s$^\wedge$2 instantaneous acceleration.

Starting from the above considerations it is possible to say that the Global Monitor 230 micro-jump detection takes place as soon as a number N of satellites is tracked at the same time with a previous carrier to noise ratio $Cn0^*_{k-1}$ that is larger than the minimum threshold Cn0_thr and reports in parallel a concordant, that is all the values with the same sign, wideband phase $\Delta\phi_{10}$ that is larger bigger than the phase threshold $\Delta\Phi\_thr$.

Figure 4:
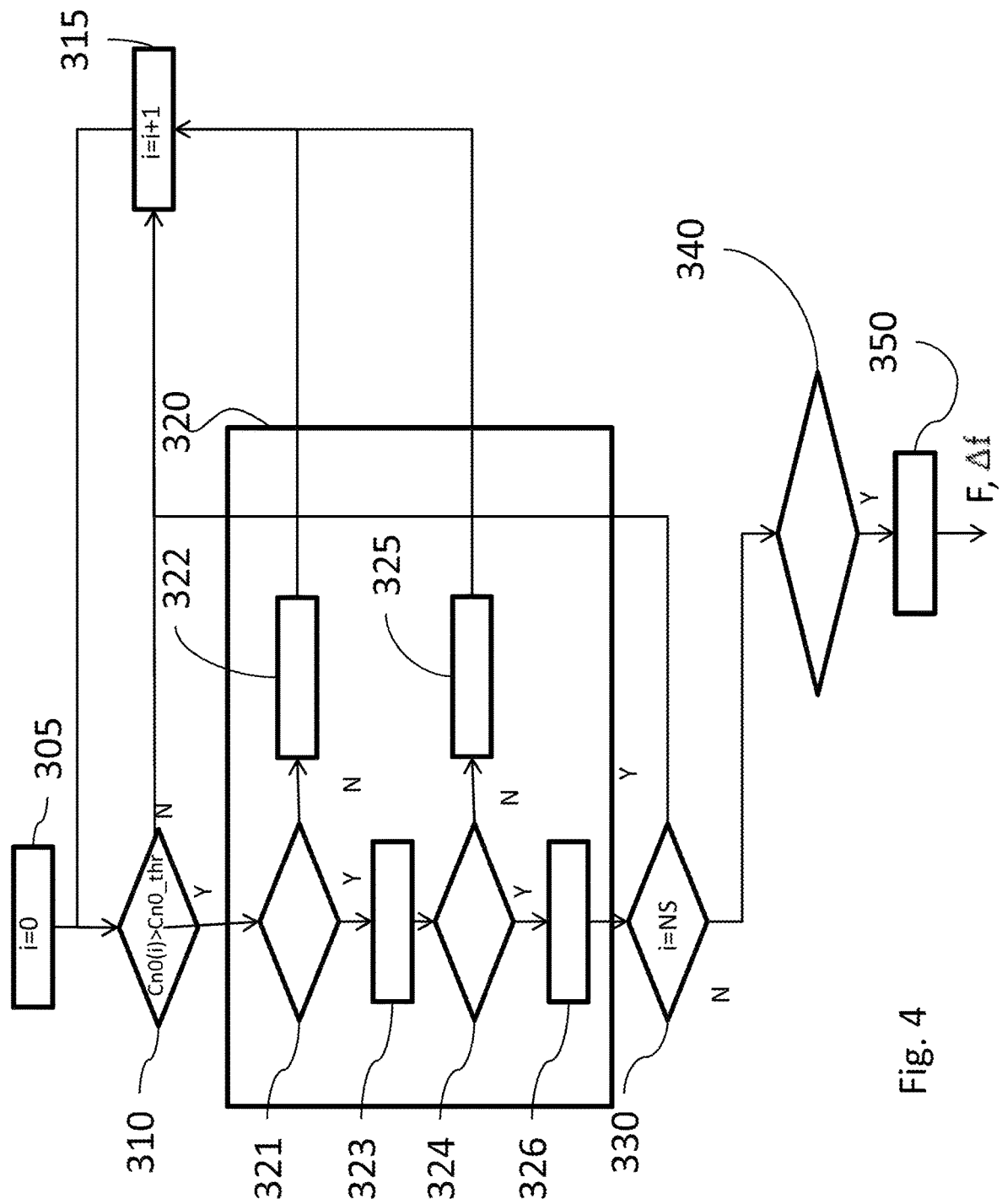
FIG. 4 is a flow diagram representative of a procedure implemented by a module of the embodiment of FIG. 2.

If the global monitor 230 scanning ends with a number of confirmations lower than the number N, these ones will be considered as elementary spikes of frequency loops and no global procedure will be triggered to recover from a TCXO micro jump (operation 350 in FIG. 4).

In the case the vector table 220 scanning ends with at least N satellites reporting a delta phase that is bigger than $\Delta\Phi\_thr$ and no more than M valid satellites have not provided a confirmation in the same scan, the micro jump detection condition is raised and a micro jump amount, i.e. a TCXO shift, $\Delta f$ is evaluated using the wideband phase $\Delta\phi_{10}$ value reported by the N satellites that clearly indicate it.

The easiest way to evaluate the TCXO shift $\Delta f$ is to derive it as a weighted phase average of the wideband phase and to convert it in frequency. Hereafter, it is reported the formula in the case 10 ms intrabit information are used $$\Delta f = \left(\frac{1}{N\pi Ts}\Sigma_{k=1}^{N} a_{cn0(k)}\Delta\phi_{10(k)}\right), Ts = 0.02s \tag{8}$$

where $a_{cn0(k)}$ could be simply set to 1 without losing of generality.

Generally speaking, the estimate could be also based on join statistical analysis of the nature of the input variables $(\Delta\phi_{10(k)},\Delta t_k)$, where $\Delta t$ is the time elapsed between the start of the monitor scan and the asynchronous storing time of the $\Delta\phi_{10(k)}$ executed by the generic satellite.

It is worth nothing that the $\Delta f$ jump is asynchronously applied to all the locked channels (also to the M no jump channels that did not clearly identify it, i.e. have ($\Delta\phi_{10}<\Delta\phi\_thr$, or a $Cn0^*_{k-1}$ value less than the threshold Cn0_thr). As complementary action of the micro jump detection a global flag F is set by the global module 230 to communicate to the user position calculation module 11 that a micro-jump event has been identified.

This is to eventually allow the Kalman Filter logic to reset its internal clock drift status (TCXO value linked) and to achieve a faster convergence to new operative point.

In FIG. 4 it is shown a flow diagram which is representative of a possible embodiment of a micro jump detection procedure 300 implemented by the micro-jump detector 200, in particular by the global monitor 230.

In step 305, the channel index i is initialized to 0. The channel index i corresponds to a row of the table 220.

Then, in test step 301, it is verified if, for a given channel index i, the previous carrier to noise ratio estimate $Cn0^*_{k-1}$ value is greater or equal than the minimum threshold value Cn0_thr.

In the negative, control is passed to block 315 which passes to the next row of the table 220, in particular by increasing by one the channel index i and perform again the test step 310.

In the affirmative, a monitor elementary check operation 320 is performed. Operation 320 is thus performed only for the rows or channels with a previous carrier to noise ratio estimate $Cn0^*_{k-1}$ value is greater or equal than the minimum threshold value $Cn0\_thr$.

The operation 320 includes in the first place the step 321 of checking if the absolute value of the wideband phase is greater than the wideband phase threshold.

In the negative, a no jump counter is increased in step 322 and control passed to step 315 to go to the next row.

In the affirmative, in step 323 a jump counter is increased and then step 324 is performed to check if the value of the wideband phase is greater than zero.

In the negative, a sign counter is increased, increasing a sign counting variable SJ, in step 325 and control passed to step 315 to go to the next row.

In the affirmative, in step 326, such sign counter is decreased, decreasing the sign counting variable SJ, then test 330 step is performed.

In the step 330 it is checked if the channel index is equal to the number NS of satellites, i.e. of channels. In other words, in step 330 it is checked if the operation 320 has been applied to all the rows of the table 220, reaching the last row.

In the negative, control is passed to step 315 to go to the next row.

In the affirmative, a detection test step 340 is performed, which includes verifying the following three conditions:

whether the jump counter value is greater than the number N of valid channels;

whether the no jump counter value is lower than the number M of no jump valid channels; and whether the absolute value of the count SJ of the sign counter is equal to the value of the jump counter.

If all these three conditions are verified, the detection test step 340 supplies an affirmative answer corresponding to the detection of a TCXO micro jump and control is passed to an micro jump evaluation operation 350 in which the amount of the micro jump $\Delta f$ is calculated, for instance according to the equation (8) above. The amount of the micro jump $\Delta f$ which is calculated is supplied to the oscillators 54$i$ of the tracking channels TRKi to parallel shift their frequency tracking when the micro-jump is detected Additionally, the micro-jump evaluation operation 350 can also include to to set a micro jump detection flag F, which value signals if a detection has occurred or not.

By way of example the table 220 can include the following data

| i | $\Delta\Phi_{10}$ [mdegree] | $Cn^*_{k-1}$ (linear, $10\log10(Cn^*_{k-1})$ is the logarithmic equivalent) | TS [μs] |
|---|---|---|---|
| 0 | 109039 | 4163 (~10log(4163) = 36 dB) | 56951993 |
| 1 | 114460 | 4574 | 56952015 |
| 2 | 143601 | 4583 | 56952037 |
| 3 | 135798 | 3894 | 56952059 |
| 4 | 93366 | 3996 | 56952081 |
| 5 | 140797 | 3569 | 56952103 |
| 7 | 60717 | 4187 | 56952126 |
| 8 | 104300 | 3896 | 56952148 |
| 14 | 105558 | 3894 | 56952172 |
| 16 | 133383 | 3845 | 56952195 |
| 17 | 98255 | 3931 | 56952217 |
| 19 | 100225 | 3559 | 56952240 |

In this case the table 220 includes a further column indicating a timestamp TS corresponding to the time instant the data for a certain channel i are written in the table 220.

The Global Monitor outputs N=12, M=0, an average $\Delta\phi_{10}$ of 111620 millidegrees, i.e. 112 degrees, corresponding to a frequency micro jump $\Delta f$ of 31 Hz according to equation (8) (~(112/180)/0.02=31 Hz), issued for instance at the time stamp TS 56952277 μs.

$\Delta f$ is evaluated as the average among the valid satellites and applied to all the locked ones.

The solutions disclosed herein have thus significant advantages with respect to the known solutions.

The solution disclose presents advantages in terms of robustness since it is based on parallel confirmation of the issue and in terms of speed since it operates before the problem completely destroys the tracking Of course, without prejudice to the principle of the invention, the details of construction and the embodiments may vary widely with respect to what has been described and illustrated herein purely by way of example, without thereby departing from the scope of the present invention, as defined by the ensuing claims.

The invention claimed is:

1. A circuit for use with a Global Navigation Satellite System (GNSS) receiver that generates in phase and quadrature components of GNSS information and a carrier to noise ratio estimate value for each tracking channel of the GNSS receiver, said circuit comprising:

a feeder circuit configured to mix information in the in phase and quadrature components to obtain a wide band phase value for each tracking channel of the GNSS receiver;

a vector table configured to store the wide band phase value and the carrier to noise ratio estimate value for each tracking channel of the GNSS receiver; and a monitoring circuit configured to scan the vector table and to detect a micro-jump of a Temperature Compensated Crystal Oscillator of the GNSS receiver on the basis of the wide band phase value and carrier to noise ratio estimate value present for each tracking channel;

said monitoring circuit further configured to compute an amount of said detected micro-jump and adjust frequency operation of a numerical controlled oscillator of a locked loop circuit within the GNSS receiver for each tracking channel to compensate for the detected micro-jump.

2. The circuit according to claim 1, wherein computation of the amount of said detected micro-jump comprises a calculation of a weighted phase average and a conversion of the weighted phase average to a frequency.

3. The circuit according to claim 1, wherein said monitoring circuit is configured to:

verify, for a given tracking channel, that the carrier to noise ratio estimate value is greater than or equal to a minimum threshold value;

check if an absolute value of the wideband phase value is greater than a wideband phase threshold;

count a first number of tracking channels for which said check of the absolute value is not greater than the wideband phase threshold;

count a second number of tracking channels for which said check of the absolute value is greater than the wideband phase threshold;

count a third number of channels for which said check of the absolute value is greater than the wideband phase threshold and the wideband phase values have a same sign;

perform a detection test on the basis of said first number of channels, said second number of channels and said third number of channels; and if the detection test is verified, then computing the amount of said detected micro-jump.

4. The circuit according to claim 3, wherein performing the detection test comprises testing that:
said first number of channels is lower than a first value;
said second number of channels is greater than a second value; and
said third number is equal to the value of the second number.

5. A circuit device for the detection of Temperature Compensated Crystal Oscillator originated micro-jumps in a Global Navigation Satellite System (GNSS) receiver:
wherein said receiver comprises:
a radio frequency circuit driven by a Temperature Compensated Crystal Oscillator and operating to down convert received satellite signals;
an analog-digital conversion circuit configured to generate digital signals from the down converted satellite signals;
an acquisition module configured to identify in digital signal codes of satellites in visibility of the receiver and provide corresponding GNSS information comprising code and frequency information, and supply through correlators samples of in phase and quadrature components of said GNSS information; and
a tracking module comprising a plurality of tracking channels having locked loop circuits with tracking numerical controlled oscillators, said tracking module operating to demodulate said GNSS information and accumulate over an accumulation period having a bit length of the GNSS information and mix between consecutive bits to produce mixed quantities which are used to compute an averaged phase rate used as a set point of said locked loop circuits;
wherein the circuit device comprises:
a feeder module configured to mix the in phase and quadrature components of the GNSS information to obtain a wide band phase value and configured to obtain a previous carrier to noise ratio estimate value for the tracking channel from accumulation over a previous accumulation period;
a vector table module configured to store the wide band phase value and the previous carrier to noise ratio estimate value for each tracking channel of the tracking module obtained by the feeder module; and
a global monitor module configured to scan the vector table module and to detect an occurrence of a micro-jump of the Temperature Compensated Crystal Oscillator on the basis of the wide band phase values and previous carrier to noise ratio estimate values for the tracking channels, said global monitor module further configured to compute a frequency amount of said detected micro-jump and adjust said tracking numerical controlled oscillators by said frequency amount to compensate for the detected micro-jump.

6. The device module according to claim 5, wherein said global monitor module is further configured to set a micro jump detection flag.

7. The device module according to claim 5, wherein the computation of the frequency amount comprises calculating a weighted phase average and conversion of the weighted phase average to a frequency.

8. The device module according to claim 5, wherein said global monitor module is configured to:
verify, for a given tracking channel, that the previous carrier to noise ratio estimate value is greater than or equal to a minimum threshold value;
check if an absolute value of the wideband phase value is greater than a wideband phase threshold;
count a number of tracking channels for which said check of the absolute value is not greater than the wideband phase threshold;
count a number of tracking channels for which said check of the absolute value is greater than the wideband phase threshold;
count the number of tracking channels for which said check of the absolute value is greater than the wideband phase threshold and the wideband phase values have a same sign;
perform a detection test on the basis of said counted numbers of channels; and
if the detection test is verified, then compute the frequency amount of said detected micro-jump.

9. The device module according to claim 8, wherein performance of the detection test comprises verifying that:
said number of tracking channels for which said check of the absolute value is not greater is lower than a given value;
said number of tracking channels for which said check of the absolute value is greater is greater than a given value; and
said number of tracking channels for which said check of the absolute value is greater than the wideband phase threshold and the wideband phase values have a same sign is equal to said number of tracking channels for which said check of the absolute value is greater than a given value.

10. A method for the detection of Temperature Compensated Crystal Oscillator originated micro-jumps in a Global Navigation Satellite System (GNSS) receiver, comprising:
down converting received satellite signals as a function of a frequency of a Temperature Compensated Crystal Oscillator;
analog-digital converting the down converted satellite signals to obtain digital signals;
identifying in the digital signals codes of satellites in visibility of the receiver to provide corresponding GNSS information comprising code and frequency information;
processing samples of in phase and quadrature components of said GNSS information in a tracking operation operating over a plurality of tracking channels using a locked loop to adjust numerical controlled oscillators which output a frequency is used to demodulate said GNSS information, said tracking operation accumulating over an accumulation period having the bit length of the GNSS information and mixing between consecutive bits to produce mixed quantities which are used to compute an averaged phase rate used as set point of said locked loop;
mixing the in phase and quadrature components of the GNSS information to obtain a wide band phase value;
obtaining a previous carrier to noise ratio estimate value for the tracking channel from accumulation over a previous accumulation period;
storing in a table the wide band phase value and the previous carrier to noise ratio estimate value for each tracking channel;
scanning the table to detect the occurrence of a micro-jump on the basis of the wide band phase values and previous carrier to noise ratio estimate values for each tracking channel;
computing a frequency amount of said detected micro-jump; and using said frequency amount to adjust said tracking numerical controlled oscillators to compensate for the detected micro-jump.

11. The method according to claim 10, further comprising setting a micro jump detection flag in response to the detected micro-jump.

12. The method according to claim 10, wherein the computing the frequency amount comprises calculating a weighted phase average and conversion of the weighted phase average to a frequency.

13. The method according to claim 10, wherein detecting the occurrence comprises:
verifying, for a given tracking channel, that the previous carrier to noise ratio estimate value is greater than or equal to a minimum threshold value;
checking if an absolute value of the wideband phase value is greater than a wideband phase threshold;
counting a number of tracking channels for which said check of the absolute value is not greater than the wideband phase threshold;
counting a number of tracking channels for which said check of the absolute value is greater than the wideband phase threshold;
counting the number of tracking channels for which said check of the absolute value is greater than the wideband phase threshold and the wideband phase values have a same sign;
performing a detection test on the basis of said counted numbers of channels; and
if the detection test is verified, then computing the frequency amount of said detected micro-jump.

14. The method according to claim 13, wherein performing the detection test comprises verifying that:
said number of tracking channels for which said check of the absolute value is not greater is lower than a given value;
said number of tracking channels for which said check of the absolute value is greater is greater than a given value; and
said number of tracking channels for which said check of the absolute value is greater than the wideband phase threshold and the wideband phase values have a same sign is equal to said number of tracking channels for which said check of the absolute value is greater than a given value.

15. A method, comprising:
generating in phase and quadrature components of Global Navigation Satellite System (GNSS) information and a carrier to noise ratio estimate value for each tracking channel of a GNSS receiver;
mixing information in the in phase and quadrature components to obtain a wide band phase value for each tracking channel of the GNSS receiver;
storing, in a vector table, the wide band phase value and the carrier to noise ratio estimate value for each tracking channel of the GNSS receiver; and
scanning the vector table to detect a micro-jump of a Temperature Compensated Crystal Oscillator of the GNSS receiver on the basis of the wide band phase value and carrier to noise ratio estimate value present for each tracking channel;
computing an amount of said detected micro-jump; and
adjusting frequency operation of a numerical controlled oscillator of a locked loop circuit within the GNSS receiver for each tracking channel to compensate for the detected micro-jump.

16. The method according to claim 15, wherein computing the amount of said detected micro-jump comprises calculating a weighted phase average and converting the weighted phase average to a frequency.

17. The method according to claim 15, wherein detecting the micro-jump comprises:
verifying, for a given tracking channel, that the carrier to noise ratio estimate value is greater than or equal to a minimum threshold value;
checking if an absolute value of the wideband phase value is greater than a wideband phase threshold;
counting a first number of tracking channels for which said check of the absolute value is not greater than the wideband phase threshold;
counting a second number of tracking channels for which said check of the absolute value is greater than the wideband phase threshold;
counting a third number of channels for which said check of the absolute value is greater than the wideband phase threshold and the wideband phase values have a same sign;
performing a detection test on the basis of said first number of channel, said second number of channels and said third number of channels; and
if the detection test is verified, then computing the amount of said detected micro-jump.

18. The method according to claim 17, wherein performing the detection test comprises testing that:
said first number of channels is lower than a first value;
said second number of channels is greater than a second value; and
said third number is equal to the value of the second number.

* * * * *